June 1, 1965  A. E. BREED  3,186,153
TINE AND MOUNTING FOR RAKES AND THE LIKE
Filed April 30, 1963
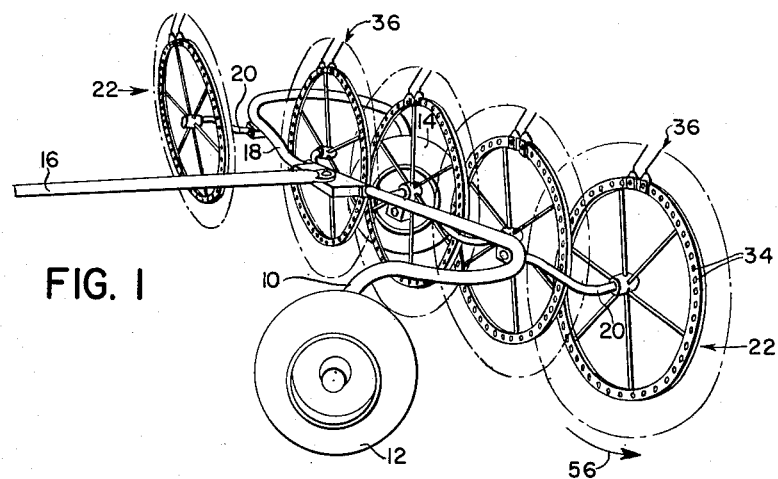
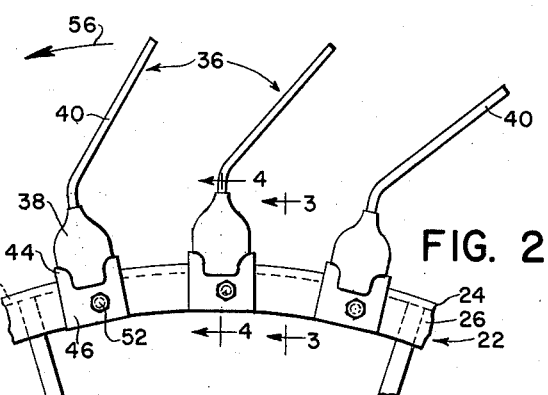
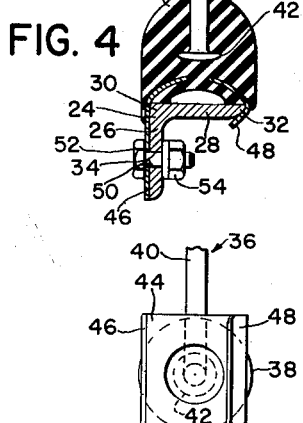
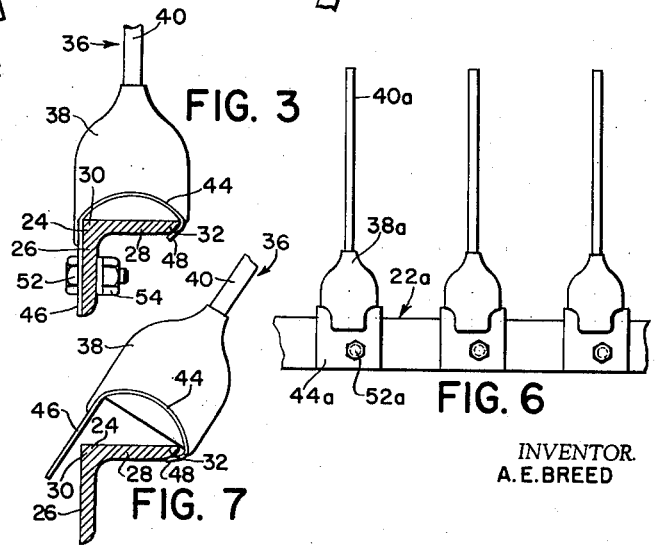
INVENTOR.
A. E. BREED United States Patent Office 3,186,153
Patented June 1, 1965

3,186,153
TINE AND MOUNTING FOR RAKES AND THE LIKE
Arie E. Breed, Ottumwa, Iowa, assignor to Deere & Company, Moline, Ill., a corporation of Delaware
Filed Apr. 30, 1963, Ser. No. 276,744
9 Claims. (Cl. 56—400)

This invention relates to improvements in means for raking or otherwise advancing or moving harvested crops such as hay, straw and the like, and more particularly the invention pertains to improvements in tine or tooth mountings in rotatable or equivalent elements.

The invention finds particular utility in rakes of the side-delivery type, whether these rakes utilize bars or wheels as the movable elements to which the tines are attached. It has heretofore been common practice in both types of rakes to utilize tines or teeth, each of which had a coil of the same material as the tine for absorbing shocks and otherwise providing resilience. However, it has recently become known to utilize elastomer material in the form of a block interposed between the carrying element and the tine itself. Because of the success of these rubber mountings, they have gained widespread use and favor, but there is still room for improvement in the specific mounting in certain areas.

According to the present invention, therefore, it is a principal object to provide an improved mounting. Specifically, it is an object of the invention to provide a mounting for a rake of the wheel type, as distinguished from the bar type; although, the specific mounting can be used in certain bar-type rakes. It is a further object of the invention to provide a mounting which may be readily attached and detached, which facilitates not only assembly in the original installation but also replacement of worn or damaged teeth, or even in the replacement of the conventional coil-type tines. Specifically, it is an object of the invention to design the mounting in such manner that it can temporarily be retained frictionally in place while additional fastening means is installed.

The foregoing and other objects inherent in and encompassed by the invention will become apparent as preferred embodiments thereof are disclosed in detail in the ensuing description and accompanying sheet of drawings, the figures of which are described below:

FIG. 1 is a perspective view of a typical rake of the wheel type, portions of the view being illustrated in broken lines in the interests of brevity and clarity.

FIG. 2 is an enlarged fragmentary portion of one of the wheels shown in FIG. 1.

FIG. 3 is a view, partly in section, as seen along the line 3—3 of FIG. 2 and drawn to an enlarged scale.

FIG. 4 is a section taken on the line 4—4 of FIG. 2 and drawn to the scale of FIG. 3.

FIG. 5 is a bottom view of a tine mounting as shown in the preceding figures.

FIG. 6 is a view of a modification showing the use of similar tines on a straight rake bar as distinguished from a wheel.

FIG. 7 is a view similar to FIG. 3 but showing a preliminary stage in the installation of a mounting.

The rake chosen for purposes of illustration and as shown in FIG. 1 comprises a main frame 10 carried on transversely spaced apart ground-engaging wheels 12 and 14 and equipped with a draft tongue 16 by means of which the rake may be connected to a tractor or equivalent towing vehicle (not shown). The diagonal or intermediate portion of the frame 10, as at 18, is provided with a plurality of crank axles 20, each of which journals thereon a rake wheel 22 having a rim of L-shaped section (FIGS. 2, 3, 4, 6 and 7). The rim is designated as a whole by the numeral 24 and is made up of an annular radial flange 26 and an annular axial flange 28 joined to and extending from an outer portion 30 of the radial flange 26 to an axially opposite free annular edge 32. The radial flange 26 is provided with a series of uniformly angularly spaced openings 34.

In the wheel-type embodiment, the rim 24 constitutes an endless supporting bar or element and has mounted thereon a plurality of rake teeth, each of which is designated as a whole by the numeral 36. Each tooth includes a rubber or equivalent elastomer mounting element 38 adapted to be positioned with its inner or lower end adjacent to and projecting radially outwardly from the axial flange 28 of the rim. A tine 40 of steel or other material different from that of the elastomer element 38 is secured to and projects radially outwardly from the element. In the instance shown here, the tine 40 has an enlarged head 42 which is embedded in the block 38. This can be accomplished in a preliminary molding operation.

The tooth additionally includes a securing clip 44 of steel or material other than that of the element. The clip is separate from the tine, being spaced therefrom in a direction lengthwise of the tine, as clearly shown in FIG. 4. The clip may, like the head of the tine 40, be preliminarily molded into or embedded in the block 38. Portions of the clip project respectively at opposite sides of the block or element 38 in the form of an ear part 46 at one side and a hook part 48 at the opposite side.

The ear part 46 has therein an aperture 50 which is adapted to be alined or registered with an associated opening 34 in the rim 24. The hook part is shaped to engage and hook over the associated portion of the free edge 32 of the axial flange 28. Installation is completed by the use of fastener means, one for each rake tooth, each fastener in this case being shown as a bolt 52 and cooperating nut 54.

As thus shown in FIG. 2, the design of the rake tooth is such that the center line of the fastener 52–54 is offset circumferentially in a trailing direction relative to the direction of rotation of the wheel, which direction of rotation is designated by the arrow 56. The force directed against the outer end of the tine 40, each of which in this case is bent in a trailing direction as respects the direction of rotation, is such that it applies load to the tine or mounting about the axis of the fastener. Because of the aforesaid offset of the fastener relative to a radius centrally through the mounting block 38, a greater lever arm exists between the axis of the fastener and the front corner of the mount than between the fastener axis and the rear corner, thus improving the torque reaction of the mounting. As shown in FIG. 4, the under surface of the block 38 engages the outer surface of the annular flange 28 of the rim and, when the hook part 48 is securely hooked under the annular edge 32 and the ear part 46 is securely bolted in place by the fastener 52, the metal part of the mounting is substantially rigid. Therefore, the mounting block 38 acts as a radial resilient arm of which the associated tine 40 is a continuation.

FIG. 7 illustrates the manner of preliminary assembly of the tine on the rim 24, for example. As will be seen, the hook part 48 may be hooked temporarily over the outer annular edge 32 of the rim, and the mounting turned generally about an axis through the interengagement of the parts 32–48. The distance between the hook 48 and the ear 46 is slightly less than the axial dimension of the rim so that when the mounting is forced into place, just prior to installation of the bolts 52, there will be a frictional engagement between the ear 46 and associated side wall of the radial flange 26. This will serve to hold the tine temporarily in place while the assembler installs the bolts 52 and adds the nuts 54.

FIG. 6 illustrates the embodiment in which tooth mountings are used on a straight bar, designated here by the numeral 22a. The rake teeth are identical to those previously described except that the tines may be straight rather than bent, and for this reason the tines are shown at 40a, the mounting blocks at 38a, the mounting clips at 44a and the fasteners at 52a. Otherwise, the same characteristics of structure, use and assembly are present.

It is a significant feature of the invention that the particular mounting clip adapts the mounting for use with supporting elements of shapes or sections such as those illustrated. It will be noted that only a single fastener need be used for each tooth, which is an attribute of the design that includes the hook 48 and the apertured ear 46.

Features and advantages other than those enumerated will readily occur to those versed in the art, as will many modifications and alterations in the preferred embodiments disclosed, all of which may be achieved without departure from the spirit and scope of the invention.

What is claimed is:

1. A tined wheel for rakes and the like, comprising: a rim of L-shaped section having an annular radial flange, including a peripherally outer portion, and an annular axial flange joined to and extending from said portion to an axially opposite free annular edge, and said radial flange having a series of uniformly angularly spaced openings therethrough; a plurality of rake teeth on and spaced circumferentially of said rim, each tooth including an elastomer mounting element adjacent to and projecting radially outwardly from the axial flange, a tine of material other than said element and secured to and projecting in a radial direction outwardly from said element, a securing clip of material other than said element and separate from the tine and secured to said element, said clip having an ear part extending radially inwardly alongside the radial flange, and provided with an aperture therein in register with the associated flange opening, and a hook part axially opposite to said ear part and engaging the associated portion of the free edge of said axial flange; and a plurality of fasteners, one cooperating with each flange opening and its registered ear part aperture.

2. The invention defined in claim 1, in which: each tine is secured to its mounting element on a radius of the wheel that is circumferentially offset from a radius through the associated flange opening and its registered ear part aperture, said offset being counter to the direction of normal rotation of the wheel.

3. The invention defined in claim 1, in which: the axial dimension between the ear part and its associated hook part is slightly less than the axial width of the rim and said clip is yieldable to expand to said axial width during installation of the tine so as to frictionally grip the rim prior to installation of the associated fastener.

4. For a rake and the like, a support of L-shaped section having an outer transverse flange including a free edge and a perpendicular flange joined to the outer flange at the portion of the latter across from said free edge and extending inwardly from said outer flange, said perpendicular flange having a series of openings spaced therealong, a plurality of rake teeth on and spaced along the support on the order of said openings, each tooth including an elastomer mounting element adjacent to and projecting outwardly from the outer flange, a tine of material other than said element and secured to and projecting outwardly from said element, a securing clip of material other than said element and separate from the tine and secured to said element, said clip having an ear part extending inwardly alongside the perpendicular flange, and provided with an aperture therein in register with the associated flange opening, and a hook part axially opposite to said ear part and engaging the associated portion of the free edge of said outer flange; and a plurality of fasteners, one cooperating with each flange opening and its registered ear part aperture.

5. The invention defined in claim 4, in which: the transverse dimension between the ear part and its associated hook part is slightly less than the transverse width of the support and said clip is yieldable to expand to said support width during installation of the tine so as to frictionally grip the support prior to installation of the associated fastener.

6. A tined wheel for rakes and the like, comprising: a rim having first and second axially opposite sides, said first side including an annular series of lip means and said second side having a series of circumferentially spaced openings therein; a plurality of rake teeth on and spaced circumferentially of said rim, each tooth including an elastomer mounting element adjacent to and projecting radially outwardly from said rim, a tine of material other than said element and secured to and projecting in a radial direction outwardly from said element, a securing clip of material other than said element and separate from the tine and secured to said element, said clip having an ear part extending radially inwardly alongside the second side and provided with an aperture therein in register with the associated opening, and a hook part axially opposite to said ear part and engaging the associated lip means at said first side; and a plurality of fasteners, one cooperating with each opening and its registered ear part aperture.

7. For a rake and the like, a support having transversely opposed first and second sides, said first side including a series of lip means and said second side including a series of spaced openings, a plurality of rake teeth on and projecting outwardly from the support, each tooth including an elastomer mounting element adjacent to and projecting outwardly from the support, a tine of material other than said element and secured to and projecting outwardly from said element, a securing clip of material other than said element and separate from the tine and secured to said element, said clip having an ear part extending inwardly alongside the second side of the support and provided with an aperture therein in register with the associated opening, and a hook part axially opposite to said ear part and engaging the associated lip means at said first side; and a plurality of fasteners, one cooperating with each opening and its registered ear part aperture.

8. A tooth for rakes and the like and adapted for mounting on an elongated support of L-shaped section to project outwardly therefrom, comprising: an elastomer mounting element having opposite first and second ends and opposite sides; fastener means of material other than said element and secured to said first end and including at one of said sides an apertured ear part adapted to engage one flange of the support and at said opposite side a hook part adapted to hook over the free edge of the other flange of the support, and a tine of material other than said element and secured to and projecting from the second end of said element.

9. The invention defined in claim 8 in which: the transverse dimension between the ear part and the hook part is slightly less than the transverse width of the one flange of the support and said clip is yieldable to expand to said support width during installation of the tine so as to frictionally grip the support prior to installation of a fastener through the apertured ear part.

References Cited by the Examiner
UNITED STATES PATENTS

| | | | |
|---|---|---|---|
| 1,501,612 | 7/24 | Martin | 56—400 |
| 3,065,591 | 11/62 | Gustafson | 56—400 |
| 3,096,609 | 7/63 | Garrett et al. | 56—400 |
| 3,102,377 | 9/63 | Garrett | 56—400 |

T. GRAHAM CRAVER, *Primary Examiner.*

RUSSELL R. KINSEY, *Examiner.*